F. BOLLINGER.
AUTOMOBILE TAIL SIGNAL.
APPLICATION FILED DEC. 15, 1913.
1,183,162.
Patented May 16, 1916.
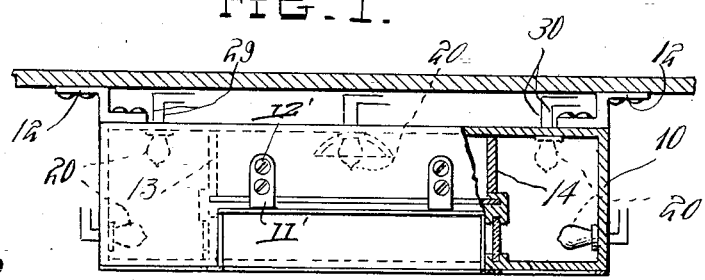
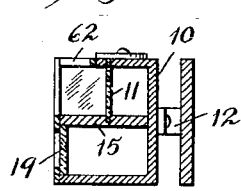
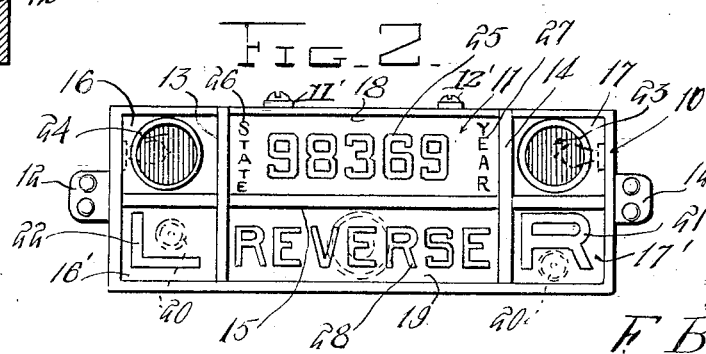
Inventor
F. Bollinger

UNITED STATES PATENT OFFICE.

FREDERICK BOLLINGER, OF AKRON, OHIO.

AUTOMOBILE TAIL-SIGNAL.

1,183,162. Specification of Letters Patent. Patented May 16, 1916.

Original application filed September 24, 1913, Serial No. 791,589. Divided and this application filed December 15, 1913. Serial No. 806,874.

*To all whom it may concern:*

Be it known that I, FREDERICK BOLLINGER, a citizen of United States, residing at Akron, in the county of Summit, State of Ohio, have invented certain new and useful Improvements in Automobile Tail-Signals; and I do hereby declare the following to be a full, clear, and exact description of the invention, such as will enable others skilled in the art to which it appertains to make and use the same.

This invention relates to signal devices for attachment to the rear and front of an automobile, and will operate to indicate to those in rear and front of the car just what the chauffeur is about to do with his car and is a division of my application filed Sept. 24, 1913. S. N. 791,589.

A further object is to provide a tail signal including a casing having separate chambers illuminated by electric lights, which lights are under the control of the chauffeur, such compartments displaying respective signals such as the car number, the word Reverse, and the letters R. and L designating right and left turns, the light illuminating the car number being lighted at all times after dark.

With these and other objects in view, this invention resides in the novel features of construction, formation, combination and arrangement of parts to be hereinafter more fully described, claimed and illustrated in the accompanying drawing, in which:—

Figure 1 is a plan view of my device, and Fig. 2 is a rear elevation of the same. Fig. 3 is a transverse sectional view taken in a vertical plane, showing the position of the "Reverse" and also the license number.

Referring to the drawing, in which like characters of reference designate similar parts, 10 designates a metal oblong casing the rear face of which is equipped with a translucent glass closure 11, and the front face of which is equipped at the ends with attaching brackets 12 for securing the casing to the automobile body. The glass closure 11 is removably mounted in the casing as will be readily seen in Fig. 1 of the drawing and this closure is held in place normally by means of clips 11' which are maintained upon the casing by screws 12'. Within the casing at the ends are disposed vertical partitions 13 and 14, and disposed about centrally in the casing is a horizontal partition 15, these partitions dividing the casing into four separate compartments including end compartments 16—16' and 17—17', and upper and lower compartments 18 and 19 between the end compartments. Each compartment contains one or more electric light bulbs as indicated at 20 for illuminating the compartment.

On one end of the translucent glass closure 11 is formed the letter R, the same being of transparent glass as indicated at 21. On the other end of the translucent glass is the letter L formed of transparent glass as indicated at 22. Above the letters R and L are respective disks 23 and 24 formed preferably of red colored glass. On the upper central portion of the translucent glass is formed of transparent glass the license number as indicated at 25, with the name of the State and year formed of transparent glass on opposite sides of the license number as indicated at 26 and 27. On the lower center portion of the translucent glass is formed the words Reverse of transparent glass as indicated at 28.

The electric light bulbs in the end compartments 16' and 17' are connected to corresponding circuit wires 29 and 30 which are connected to a source of electricity such as for instance, a battery, a magneto or the like.

What is claimed is:—

1. In an automobile signaling device, a casing, said casing consisting of two end compartments and an intermediate compartment, said end compartments protruding beyond the face of the intermediate compartment and forming a chamber therebetween, the walls of the end compartments, facing said chamber, being transparent, a character containing plate forming the front of the intermediate compartment and located rearwardly of the front of said end compartments, means for illuminating said compartments separately, said compartments being constructed and arranged so that when the end compartments are illuminated, light will be permitted to pass to the outer face of the front of the intermediate compartment through the transparent end walls thereof.

2. In an automobile indicating device, an elongated casing consisting of end and intermediate compartments, the end compartments protruding beyond the face of one of the intermediate compartments, means for lighting said compartments separately and glass walls forming the sides of the end compartments adjacent to the intermediate compartment.

In testimony whereof, I affix my signature, in the presence of two witnesses.

FREDERICK BOLLINGER.

Witnesses:
NETTIE M. GRIFFITHS,
J. I. BACHTEL.